United States Patent
Hofbauer et al.

[11] Patent Number: 5,957,492
[45] Date of Patent: Sep. 28, 1999

[54] GAS GENERATOR

[75] Inventors: Ingrid Hofbauer, München; Markus Leifheit, Moosinning; Marc Winterhalder, München, all of Germany

[73] Assignee: TRW Airbag Systems GmbH & Co. KG, Aschau am Inn, Germany

[21] Appl. No.: 09/089,655

[22] Filed: Jun. 3, 1998

[30] Foreign Application Priority Data

Jun. 3, 1997 [DE] Germany ............... 197 23 256

[51] Int. Cl.⁶ .................... B60R 21/26; B60R 21/28
[52] U.S. Cl. ............................... 280/737; 280/741
[58] Field of Search .................... 280/736, 737, 280/741; 102/530, 531

[56] References Cited

U.S. PATENT DOCUMENTS

| | | |
|---|---|---|
| 5,100,174 | 3/1992 | Jasken et al. ............... 280/741 |
| 5,184,846 | 2/1993 | Goetz . |
| 5,487,559 | 1/1996 | Headley . |
| 5,584,505 | 12/1996 | O'Loughlin et al. .......... 280/737 |
| 5,609,361 | 3/1997 | Bergerson et al. . |
| 5,630,619 | 5/1997 | Buchanan et al. . |
| 5,762,368 | 6/1998 | Faigle et al. ............... 280/737 |

FOREIGN PATENT DOCUMENTS

| | | |
|---|---|---|
| 0639483 | 2/1995 | European Pat. Off. . |
| 19533606 | 3/1996 | European Pat. Off. . |
| 0741064 | 11/1996 | European Pat. Off. . |
| 2119927 | 11/1971 | Germany . |
| 2362513 | 7/1974 | Germany . |
| 7422465 | 11/1977 | Germany . |
| 4236617 | 5/1993 | Germany . |
| 19601448 | 7/1997 | Germany . |
| 9809851 | 3/1998 | WIPO . |

*Primary Examiner*—Lanna Mai
*Assistant Examiner*—Jeff Restifo
*Attorney, Agent, or Firm*—Tarolli, Sundheim, Covell, Tummino & Szabo

[57] ABSTRACT

A gas generator, in particular for vehicle occupant restraint systems, has a housing with chambers provided therein, of which at least one chamber is filled with gas and at least one chamber is filled with propellant the gas generator further has at least one igniter for igniting the propellant. The igniter cap is secured in a gas- and pressure-tight manner by welding to a closure part which closes an opening in the housing.

19 Claims, 1 Drawing Sheet

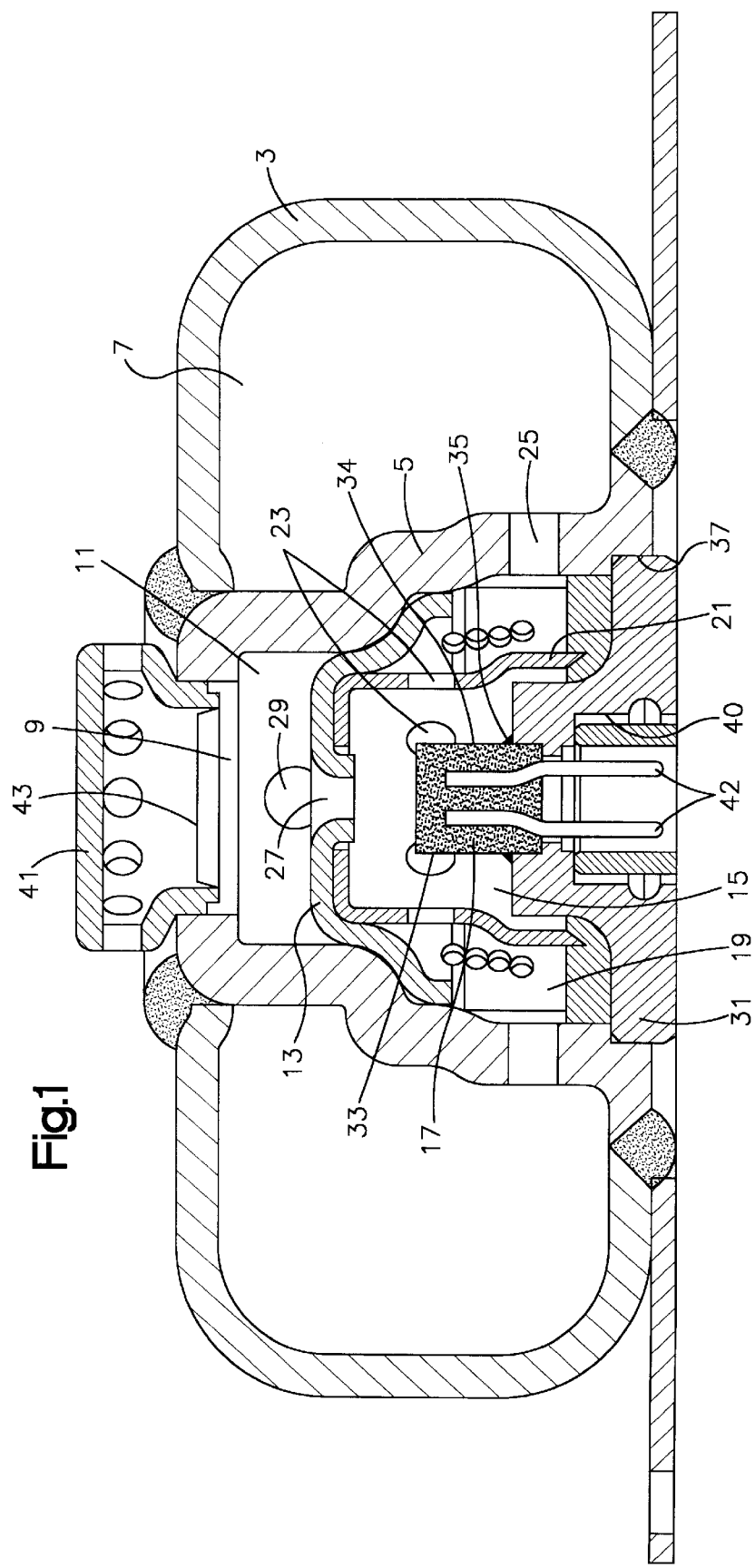

GAS GENERATOR

TECHNICAL FIELD

The invention relates to a gas generator, in particular for vehicle occupant restraint systems.

BACKGROUND OF THE INVENTION

With the gas-filled gas generators, in particular hybrid gas generators filled with compressed gas, the problem exists that their housing must remain pressure- and gas-tight for years, so that the gas can not creep to the outside. Therefore, expensive sealing measures are necessary. In order to prevent an exit of gas in the region of the igniter, in the gas generators hitherto the igniter is, therefore, arranged in a gas- and pressure-tight chamber. A bursting membrane, which usually forms the front wall of the chamber wall, is destroyed by the igniter and possibly by the adjoining booster charge, so that the produced hot gases and hot particles can flow into the adjoining combustion chamber and ignite the fuel there. An expensive sealing is shown, for example, in DE 195 33 606 A1.

BRIEF SUMMARY OF THE INVENTION

The invention provides a gas generator which is constructed more simply than those known hitherto and which can be produced at a favorable cost. The gas generator according to the invention has a housing with at least one chamber filled with gas and at least one combustion chamber filled with propellant. At least one igniter is provided which comprises ignition material and is for igniting the propellant. The housing has an opening and a closure part which closes the opening. The igniter has an igniter cap encasing the ignition material and being secured to the closure part in a gas- and pressure-tight manner by welding.

In contrast to the known gas generators, a separate, closed chamber for sealing off the igniter is not necessary, nor is an expensive sealing necessary between the igniter cap and the closure part. The gas-filled chamber is open towards the igniter. An escape of gas between the igniter and the closure part is prevented, due to the gas- and pressure-tight weld connection. On deflagration of the igniter, the propellant can, in addition, be ignited more quickly because only the very thin igniter cap is situated between ignition material and the propellant. Hitherto, welding in close proximity to pyrotechnic material has been avoided. The invention virtually sets aside this fact.

Advantageous developments of the invention form the subject matters of the sub-claims.

According to the preferred embodiment, the gas-filled chamber is a pressure chamber, the gas of which is under pressure and which is open towards the combustion chamber.

The gas- and pressure-tight sealing is realized preferably by laser welding.

The opening onto which the closure part is placed preferably serves for filling the gas generator with propellant.

DETAILED DESCRIPTION OF THE DRAWING

FIG. 1, the only drawing, shows a longitudinal section through an embodiment of the gas generator according to the invention, constructed as a hybrid gas generator.

DETAILED DESCRIPTION OF A PREFERRED EMBODIMENT

In FIG. 1, a hybrid ring chamber gas generator is shown for a vehicle occupant restraint system, more precisely for the inflating of a driver's gas bag. The housing of the gas generator has an outer wall 3 and an inner wall 5 spaced radially apart therefrom. Between the walls, an annular shaped pressure chamber 7 is formed which is filled with compressed gas. The inner wall 5 separates the pressure chamber 7 from a radially inner space which is divided into individual chambers. An upper mixing chamber 11, adjoining an outflow opening 9, is separated by an intermediate base 13 from two lower chambers, namely a radially inner expansion chamber 15 into which an igniter 17 projects, and a radially outer annular combustion chamber 19. The combustion chamber 19 is filled with propellant in the form of tablets. The combustion chamber 19 and the expansion chamber 15 are separated from each other by a cap-like diffuser, hereinafter named the igniter diffuser 21. As none of the chambers is completely sealed off inside the housing, the same pressure exists in each chamber. Several openings 23 in the igniter diffuser 21, openings 25 in the inner wall 5, a central axial opening 27 in the intermediate base as well as two diametrically opposed upper openings 29 in the inner wall 5 serve for the pressure equalization and of course for the produced gas reaching the outlet opening 9 in a directed manner in the case of restraint.

The igniter 17 is secured in a gas- and pressure-tight manner to a closure part 31 in the form of a disc-shaped base plate and forms therewith a pre-assembled unit. The gas- and pressure-tight connection is achieved in that an igniter cap 33 of metal which surrounds the primary and the secondary charge of the igniter is secured to the closure part in a gas- and pressure-tight manner preferably by laser welding. A corresponding weld seam is marked by 35. The ignition material of the secondary charge, which surrounds the primary charge, directly adjoins the igniter cap 33. The igniter cap is formed so as to be cylindrical and has a front wall projecting into the expansion chamber 15, as well as a cylindrical jacket 34. The closure part 31 has at the inner side, i.e. towards the expansion chamber 15, an annular recess which is adapted to the igniter cap 33 as regards its geometry and its dimensions, and into which the igniter cap is inserted before welding. The closure part 31 additionally has a recess 40 at the outer side, into which recess plug contacts 42 of the igniter project. The plug contacts 42, however, do not outwardly protrude from the closure part 31, so that there is no danger of these being bent during transport of the gas generator. On installation of the gas generator, a plug is inserted into the recess. The closure part 31 serves for the gas- and pressure-tight closing of a filling opening 37. Propellant is filled into the combustion chamber 19 via the filling opening 37. Then the closure part 31 is placed onto the filling opening 37 and is welded to the housing. Finally, filling with compressed gas takes place via an opposite filling opening for gas, which is already shown in FIG. 1 closed by a closure in the form of a diffuser 41 having a bursting sheet 43 secured thereon, the diffuser 41 is put in place and likewise welded to the housing.

In the case of an accident, the igniter 17 activates a triggering sensor, not shown, so that the primary and secondary charges deflagrate and produce gas and hot particles. The ignition cap 33 is constructed such that its front wall, which faces the bursting disc 43, opens first and the gases and particles, accompanied by a blast wave, enter at high speed into the expansion chamber 15 and distribute uniformly therein. A portion of the blast wave, of the hot gases and particles passes through the opening 27 and strikes directly onto the bursting disc 43 and leads to its immediate destruction. The other portion of the hot gases and particles arrives via the openings 23 into the combustion chamber 19, where they lead to the ignition of the propellant. The gases produced on deflagration of the propellant, in turn, flow through the openings 25 into the pressure chamber and mix therein with the compressed gas. The hot gas mixes with the cold compressed gas and in so doing afterburns. The compressed gas and also the hot gas flow via the openings 29 into the mixing chamber 11, likewise the hot gas arriving into the mixing chamber 11 via the expansion chamber 15, which hot gas is produced on deflagration of the propellant. Also in the mixing chamber 11, the gases react chemically with each other. The gases finally leave the housing via the diffuser 41.

As the igniter 17 is not additionally completely shielded by a wall surrounding it towards the combustion chamber 19, a rapid ignition behavior results. The expansion space 15 and the igniter diffuser 21 bring about a uniform inflow of the hot gases into the combustion chamber 19 and thereby lead to a reproducible ignition behavior, without a high power booster charge having to be used.

We claim:

1. A gas generator for a vehicle occupant restraint system, said gas generator comprising:

a housing with at least one chamber filled with gas and at least one combustion chamber filled with propellant;

at least one igniter which comprises ignition material and is for igniting the propellant; and a mixing chamber being in fluid connection with said gas-filled chamber and said mixing chamber being in fluid connection with said combustion chamber through a connection distinct from the connection between said mixing chamber and said gas-filled chamber;

said housing having an opening and a closure part which closes said opening;

said igniter having an igniter cap encasing said ignition material and being secured to said closure part in a gas-and-pressure-tight manner by welding;

said mixing chamber having an outflow opening that is closed before activation of said gas generator.

2. The gas generator according to claim 1, wherein said gas-filled chamber is a pressure chamber which contains gas under pressure and which is open to said combustion chamber.

3. The gas generator according to claim 1, wherein said opening closed by said closure part serves as a filling opening at least for said propellant.

4. The gas generator according to claim 1, wherein said igniter cap is secured to said closure part by laser welding.

5. The gas generator according to claim 1, wherein said housing has a base plate and said closure part forms at least a part of said base plate.

6. The gas generator according to claim 3, wherein said gas generator is a ring chamber gas generator, wherein said combustion chamber is surrounded in the radial direction by said gas-filled chamber and wherein said filling opening extends only to said combustion chamber in the radial direction.

7. The gas generator according to claim 1, further comprising an expansion chamber for hot gases arising on deflagration of said ignition material, said expansion chamber being surrounded by said combustion chamber and being in fluid connection therewith, said igniter extending into said expansion chamber.

8. The gas generator according to claim 1, wherein all said chambers inside said housing are open in the non-activated state of said gas generator, so that a uniform pressure exists inside said gas generator.

9. A gas generator for a vehicle occupant restraint system, said gas generator comprising:

a housing with at least one chamber filled with gas and at least one combustion chamber filled with propellant;

at least one igniter which comprises ignition material and is for igniting the propellant; and an expansion chamber for hot gases arising on deflagration of said ignition material;

said housing having an opening and a closure part which closes said opening;

said igniter having an igniter cap encasing said ignition material and being secured to said closure part in a gas-and-pressure-tight manner by welding;

said igniter extending into said expansion chamber;

said expansion chamber being surrounded by said combustion chamber and being in fluid connection therewith in the non-activated state of said generator.

10. The gas generator according to claim 9, wherein said gas-filled chamber is a pressure chamber which contains gas under pressure and which is open to said combustion chamber.

11. The gas generator according to claim 9, wherein said opening closed by said closure part serves as a filling opening at least for said propellant.

12. The gas generator according to claim 11, wherein said gas generator is a ring chamber gas generator, wherein said combustion chamber is surrounded in the radial direction by said gas-filled chamber and wherein said filling opening extends only to said combustion chamber in the radial direction.

13. The gas generator according to claim 9, wherein all said chambers inside said housing are open in the non-activated state of said gas generator, so that a uniform pressure exists inside said gas generator.

14. A gas generator for a vehicle occupant restraint system, said gas generator comprising:

a housing with at least one chamber filled with gas and at least one combustion chamber filled with propellant; and at least one igniter comprising ignition material for igniting the propellant;

said housing having an opening and a closure part which closes said opening;

said igniter having an igniter cap encasing said ignition material and being secured to said closure part in a gas-and-pressure-tight manner by welding;

said closure part having an inner side and a recess at said inner side into which said igniter cap is partly inserted, said recess conforming to the shape and dimensions of said igniter cap and having a side wall and a bottom wall, said recess being engaged by said igniter cap.

15. The gas generator according to claim 14, wherein said igniter cap is secured to said closure part by laser welding.

16. The gas generator according to claim 14, wherein said housing has a base plate and said closure part forms at least a part of said base plate.

17. The gas generator according to claim 14, further comprising an expansion chamber for hot gases arising on deflagration of said ignition material, said expansion chamber being surrounded by said combustion chamber and being in fluid connection therewith, said igniter extending into said expansion chamber.

18. The gas generator according to claim 14, wherein said closure part has an outer side and a recess at said outer side, wherein said igniter has plug contacts for connection of a plug, and wherein said plug contacts project into said recess at said outer side and do not outwardly protrude from said closure part.

19. The gas generator according to claim 14, wherein said igniter cap is formed so as to be cylindrical, and has a front wall and a cylindrical jacket, first said front wall and then said jacket being opened on ignition.

* * * * *